(12) United States Patent
Foreman et al.

(10) Patent No.: US 11,992,931 B1
(45) Date of Patent: May 28, 2024

(54) METHOD AND APPARATUS FOR EFFICIENT AUTOMATED PRODUCTION OF DEBONED AND OTHER MEAT CUTS UTILIZING AN ULTRASONIC KNIFE AND COUPLED CONTROLLER

(71) Applicant: Tyson Foods, Inc., Springdale, AR (US)

(72) Inventors: Doug Foreman, Springdale, AR (US); Gilbert R. Mitchell, Springdale, AR (US); Levi H. Armstrong, Kerrville, TX (US); Joshua D. Langsfeld, San Antonio, TX (US); Jorge Luis Nicho, San Antonio, TX (US); Tomas A. Blodgett, Fayetteville, AR (US); Shane Thomas Shelboum, Bethel Heights, AR (US)

(73) Assignee: Tyson Foods, Inc., Springdale, AR (US)

( * ) Notice: Subject to any disclaimer, the term of this patent is extended or adjusted under 35 U.S.C. 154(b) by 23 days.

(21) Appl. No.: 16/201,294

(22) Filed: Nov. 27, 2018

Related U.S. Application Data

(60) Provisional application No. 62/614,175, filed on Jan. 5, 2018.

(51) Int. Cl.
*G05B 19/4155* (2006.01)
*A22B 5/00* (2006.01)
(Continued)

(52) U.S. Cl.
CPC ......... *B25J 11/0055* (2013.01); *A22B 5/0035* (2013.01); *A22C 17/0006* (2013.01);
(Continued)

(58) Field of Classification Search
CPC ......... B25J 11/0055; B25J 9/16; B26D 7/086; B26D 2001/0086; B26D 1/0006;
(Continued)

(56) References Cited

U.S. PATENT DOCUMENTS 4,847,954 A 7/1989 Lapeyre et al.
5,334,084 A 8/1994 O'Brien et al.
(Continued)

OTHER PUBLICATIONS

Ekrem Misimi et al., Gribbot—Robotic 3D vision-guided harvesting of chicken fillets, Sep. 14, 2015, Computers and Electronics in Agriculture, vol. 121, pp. 84-100; https://www.sciencedirect.com/science/article/pii/S0168169915003701.*
(Continued)

*Primary Examiner* — Kenneth M Lo
*Assistant Examiner* — Tameem D Siddiquee
(74) *Attorney, Agent, or Firm* — UB Greensfelder LLP; Mark E. Stallion

(57) ABSTRACT

The technology as disclosed herein includes a method and apparatus for deboning a meat item, and more particular for deboning a poultry item including performing an initial shoulder cut for removing boneless breast meat from the poultry carcass or frame. The method and apparatus disclosed and claimed herein is a combination of a robotic arm including an ultrasonic knife implement and a vision system for varying the cut path based on the shape and size of the poultry item. The combination as claimed including the ultrasonic knife can perform a meat cut while penetrating the meat with less force than the typical penetration that occurs when using a traditional knife.

12 Claims, 7 Drawing Sheets

(51) Int. Cl.
*A22C 17/00* (2006.01)
*B25J 9/16* (2006.01)
*B25J 11/00* (2006.01)
*B26D 7/08* (2006.01)
*B26D 1/00* (2006.01)

(52) U.S. Cl.
CPC ......... *B26D 7/086* (2013.01); *G05B 19/4155* (2013.01); *A22C 17/004* (2013.01); *B25J 9/16* (2013.01); *B26D 1/0006* (2013.01); *B26D 2001/0053* (2013.01); *B26D 2001/0086* (2013.01)

(58) Field of Classification Search
CPC ........ B26D 2001/0053; A22C 17/0006; A22C 17/004; A22B 5/0035
See application file for complete search history.

(56) References Cited

U.S. PATENT DOCUMENTS

| | | | |
|---|---|---|---|
| 5,429,549 A * | 7/1995 | Verrijp | A22C 21/0023 452/154 |
| RE36,664 E | 4/2000 | O'Brien et al. | |
| 6,155,919 A | 12/2000 | Haagensen et al. | |
| 7,210,993 B2 | 5/2007 | Woods et al. | |
| 10,117,438 B2 | 11/2018 | Driscoll | |
| 2003/0145699 A1* | 8/2003 | Kim | B26D 3/10 83/13 |
| 2005/0154490 A1* | 7/2005 | Blaine | A22C 17/0086 700/186 |
| 2008/0200107 A1 | 8/2008 | Christensen et al. | |
| 2008/0281461 A1* | 11/2008 | Blaine | B26D 3/10 700/171 |
| 2011/0196661 A1* | 8/2011 | Spicola | G06T 7/62 703/11 |
| 2014/0114327 A1* | 4/2014 | Boudreaux | A61B 34/25 606/130 |
| 2015/0044338 A1* | 2/2015 | Nagle | A23G 3/0025 426/302 |
| 2016/0150213 A1* | 5/2016 | Mutti | G06K 9/228 348/143 |
| 2018/0345485 A1* | 12/2018 | Sinnet | A23L 5/10 |
| 2020/0077667 A1* | 3/2020 | Lauridsen | G06T 7/0002 |

OTHER PUBLICATIONS

Foreman, Doug, Notice of Allowance dated Jul. 26, 2021 for corresponding U.S. Appl. No. 16/907,012 "entitled Method and Apparatus for Conveying a Meat Product and Using an Ultrasonic Knife for Automated Cutting of Meat" filed Jun. 19, 2020; pp. 1-11.

* cited by examiner

METHOD AND APPARATUS FOR EFFICIENT AUTOMATED PRODUCTION OF DEBONED AND OTHER MEAT CUTS UTILIZING AN ULTRASONIC KNIFE AND COUPLED CONTROLLER

Cross Reference: This Application Entitled Method and Apparatus For Using An Ultrasonic Knife For Automated Cutting Of Meat, claims the benefit of and priority to U.S. Provisional Patent Application Ser. No. 62/614,175, also entitled Method and Apparatus For Using Ultrasonic Knife For Automated Cutting Of Meat, and filed in the Unites States Patent and Trademark Office on 5 Jan. 2018, and whereby the contents of which are incorporated herein by reference in its entirety.

BACKGROUND

FIELD: The technology as disclosed herein relates generally to food manufacturing and, more particularly, to a system and method for producing a deboned meat cut using an ultrasonic knife, particularly a poultry meat cut.

BACKGROUND: Separating animal carcasses into various primal cut components is an integral part of the meat processing industry. The primal cuts are then separated into various sub-primal cuts and further into individual meat cuts. Currently in the meat processing industry, it is common for sub-primal cuts, when being further separated into the various individual meat cuts, to be separated manually, whereby operators use hand held powered and unpowered blades to perform the separation. However, there are various apparatus and systems that have been developed to partially or fully automate the separation process. Deboning a whole meat item is also a common practice in the meat manufacturing industry. The meat separation and more particularly the deboning process when performed manually can be very labor intensive and depending on the meat cut can require a significant level of experience in order to debone the meat item efficiently and quickly and without excessive waste.

Deboning a poultry item can be particularly challenging, labor intensive and can require a sufficient level of experience and expertise. By way of illustration, a poultry shoulder cut is made on a poultry item prior to removing deboned breast meat from the carcass. It is a very complex cut such that when the cut is performed manually, it requires an individual to examine the poultry item, place the knife in the right location, make the knife move through the joint along a certain path while manipulating the wing to a certain position to facilitate the cut, and following a ribcage with a particular cutting path. It can be a complex, and a detailed cut that has to be performed on each front portion of each poultry item in order to remove the breast meat.

Robotic and automated systems have been attempted in the industry to perform the poultry shoulder cut to address the problems encountered when performing this cut manually. The systems are generally mechanical and they don't adequately adjust to the size of each individual front half portion of each poultry item that is processed on the production line resulting in a loss in yield or quality. Many of the automated systems require presorting the poultry item by size. Whereas, an operator performing this cut manually will visually observe each item and adjust the cut path as needed based on their prior experience and developed expertise. A method is needed for automated systems to adjust similarly and make the cut on each front so that the boneless breast meat can be harvested more efficiently to produce a higher and more consistent yield and quality. Otherwise, it is cost prohibitive to utilize some of the automated systems currently available.

Various automated systems have been developed with limited success. Automated robotic systems with blade implements have been developed that utilize a standard blade implement at the end of a robotic arm to perform the initial shoulder cut in an attempt to sever tendons around the shoulder joint. The automated system then grabs the wing and pulls the wing and breast meat off the carcass or frame of the poultry item. However, many automated systems have not been effective in completely severing the tendons and other connective tissue surrounding the shoulder joint resulting in the breast meat not pulling cleanly away from the carcass. If the automated system severs the tendons and muscle groups along that joint correctly, then the breast meat pulls cleanly off the frame (poultry carcass) and there are a number of smaller muscle groups that will also pull cleanly away from the carcass with the breast meat if the joint is severed properly. However, given the various sized poultry items, a cutting path that effectuates a proper cut for a given sized poultry item can vary significantly from bird to bird. When using a standard blade, the cutting path can't vary much from the most effective cutting path and still affect a sufficient cut such that the meat can be readily separated from the bones.

A skilled operator can perform this operation by hand because the skilled operator can visually examine the poultry item and through experience and learned skills, the operator can manually maneuver a hand held blade and poultry item to sever the tendons and the joint. However, many automated systems equipped with vision systems for analyzing the construct and size of the poultry have had difficulty reproducing the manual process. When an operator is performing the cut manually, the operator can sense with their hand the resistance against the blade and can visually see the depth of the cut being made. However, many automated systems don't have the ability to replicate the dynamic sensitivity and awareness of the operator and results in the automated system cutting into bone. Further, a standard blade can't afford to be off the mark by much and still be effective. Further, automated systems utilizing a standard blade will necessitate the blade being replaced by a more effective cutting tool or sharpened more regularly in order to be more effective.

Due to the force required to make the cut, it is difficult to regulate the depth of the cut, even for a skilled operator. It is even more difficult for an automated system. An appropriate cut depth must be achieved in order to sever the tendon surrounding the shoulder joint. However, if the cut is too deep, the tool will actually cut into some meat that was not intended or into an area of the bone that was unintended and will actually result in the meat remaining on the frame. If the cut is too deep, the tool will cut into meat that will then stay on the frame. If the cut is properly executed, then the tool only severs the tendons and the breast meat and the smaller muscle group meat will then pull off with the breast meat when pulled off the frame.

A better apparatus and/or method for performing a meat cut is needed for the reasons stated, and more particularly a better method is needed for improving the shoulder cut methodology for a poultry item for subsequent removal of the breast meat with improved yield.

SUMMARY

The technology as disclosed herein includes a method and apparatus for performing a meat cut, particularly a meat cut performed for deboning a meat item, and specifically for performing a shoulder cut as part of the process for deboning a meat product from a poultry item including removing boneless breast meat from the poultry carcass or frame. The method and apparatus disclosed and claimed herein is a combination of a robotic arm including an ultrasonic knife implement and a vision system coupled to a controller or other computing device for varying the cut path based on the shape and size of a meat item, particularly that of the poultry item. The combination as claimed including the ultrasonic knife can perform a meat cut with less force and more accurately than the typical penetration that occurs when using a traditional knife.

The ultrasonic knife operates smoothly and requires less penetration in order to sever targeted tendons. With less force, the ultrasonic knife is able to excuse itself through the joint areas and will only cut those tendons and muscle groups needed, and actually tends not to trim off bone. Whereas, if a conventional knife is used, then as the knife is going through a particular area, it will just cut through whatever is in its path. Now it takes a lot of force to make it go through bone and that ends up being part of the problem. The ultrasonic knife tends to somewhat excuse itself through the joint area only cutting tendons and muscle groups as opposed to bones. The ultrasonic nature of the blade tends to allow the blade to move smoother through a cut and sever an item with less force being applied as compared to a traditional knife. If a traditional blade implement is utilized, more force is required to make the cut whether the cut is being performed with an automated system or being performed manually, therefore, the possibility of cutting muscle groups unintentionally or cutting bone increases. Therefore the work that's being done by the high frequency low amplitude of the blade is more efficient.

The technology as disclosed and claimed herein uses a combination of controlling a robotic arm with a computer executed algorithm adjusted by inputs from a vision system in combination with the use of an ultrasonic blade in order to implement the cut. The computer executed algorithm controls the path of the robotic arm and ultrasonic knife implement.

A cutting path algorithm with inputs from a vision system creates a cut path. The algorithm and the vision system looks at a poultry front half, revert it in space, reads the size of it and identifies joint placement, and places the ultrasonic knife in the correct and optimal position and creates/defines the correct and optimal cut path around the shoulder joint to sever that breast muscle from the shoulder joint so that the breast meat can be cleanly pulled from the frame. The frequency of the blade can operate in the range of about approximately 18,000 Hz and above. For one implementation of the blade, the bevel of the cutting edges of the blades are from about approximately 15 degrees to about approximately 70 degrees. However, the bevel of the blade can vary beyond this range depending on the meat item being operated on without departing from the scope of the invention. It is the ultrasonic wave and agitation initiated in the meat that cause the meat to sever and not only the sharpness of the edge of the ultrasonic blade.

Sound is often described as a vibration that is transmitted through a medium. Ultrasonic waves are an "inaudible sound," the frequency of which generally exceeds about approximately 18-20 kHz. A 20-kHz frequency means that a certain medium vibrates 20,000 times per second. An ultrasonic cutter vibrates its blade with an amplitude of 10-70 μm in the longitudinal direction. The vibration is microscopic, so it cannot be seen with the human unassisted eye. The movement repeats 18,000-40,000 times per second (18-40 kHz). Because of this movement, the ultrasonic cutter/knife can easily cut food items including meat, resin, rubber, nonwoven cloths, film, composite materials in which various products are superposed. An ultrasonic cutter/knife is composed of a "transducer" that generates vibration and an "oscillator" that drives the transducer. For one implementation, a piezoelectric element is used for the transducer. When voltage is applied, the piezoelectric element displaces the transducer by a few micrometers. Periodically applying voltage generates vibration. Each object has its special frequency, by which the object is stable and easy to vibrate. By adding an external force that corresponds to that special frequency, a small force can obtain a large vibration. This phenomenon is called resonance. In an ultrasonic cutter/knife, the piezoelectric element generates a force that resonates the whole body, from the transducer to the blade tip and/or cutting edge, generating a large vibration at the tip and/or cutting edge. The oscillator periodically generates a voltage to resonate and drive the transducer. Using a component of the ultrasonic cutter/knife called the horn/Sonotrode to wring the cross-sectional area, from the piezoelectric element to the blade tip/blade edge, can obtain a larger vibration.

The vibration of the blade makes the cutting faster because the vibration of the blade also slices the material being cut in addition to the force that is being applied to the blade. If the vibrations are along the correct axis, as in said knife, then they'll do the exact same thing as a standard knife would do when the tip or cutting edge is pushed into a material for cutting, that is applying a force, meaning that the knife does most of the work in cutting because the vibration performs the same work as would be provided by applying a force to a standard cutter/knife blade.

The ultra-sonic generator converts the power supply (100-250 Volts, 50-60 Hz) into a 20 to 30 kHz, 800-1000 Volts electrical signal. This signal is applied to piezo-electrical ceramics (included in the converter) that will convert this signal into mechanical oscillations. These oscillations will be amplified by the booster and converter. The converter converts electricity into high frequency mechanical vibration. The active elements are usually piezo-electrics ceramics. The booster (optional) serves as an amplitude transformer.

The actuator vibrates at an extremely high frequency, making it ultrasonic, and it is these waves of vibration that are transmitted by the horn of the actuator all the way to the blade itself. The vibrations are created at the actuator and are transferred by the horn to a free mass. The free mass vibrates between the blade and the horn of the actuator to transmit the vibrations down the blade. The repetitive impact on the blade by the free mass, creates stress pulses that transmit to the tip/blade edge of the blade and into the item being cut. Ultimately, the repetitive cutting of the blade produces enough strain on the surface of the item being cut to fracture it. The effect of ultrasonic cutting parameters, such as resonant frequency, mode of vibration, blade tip sharpness, cutting force, cutting speed, and blade tip/blade edge amplitude are all factors.

Ultrasonic food cutting technology goes beyond the limits of conventional cutting systems by utilizing a vibrating blade as opposed to a static blade. The vibrations create an almost frictionless cutting surface, providing neater cuts, faster processing, minimal waste, longer blade life and less downtime. The induced oscillation at the cutting edge of the sonotrode with defined vibration amplitude results in faster and more efficient cutting due to less mechanical cutting force needed in comparison to other conventional blade methods or laser cutters and/or water jet cutters. The pressure on the item to be cut can be reduced due to the high number of frequencies per second. This creates a clean cut face. Ultrasound application for cutting enhances the cut surface quality, lowers the energy for cutting and improves the cut exactness. The induced oscillation at the cutting edge of the sonotrode with defined vibration amplitude results in faster and more efficient cutting due to less mechanical cutting force needed in comparison to other conventional methods such as standard blades, laser cutters and water jet cutters. In fact, the vibration reduces the friction resistance at the cutting surface. The ultrasonic knife in combination with the vision system as disclosed and claimed herein provide for an effective method and system.

In contrast, when cutting with standard cutting blades the main aim of the cutting process is to break internal bonds in a material by stressing structural elements; this is achieved by the progressive motion of a mechanical tool having a sharpened cutting edge. The stress within the material to be cut is directly proportional to the applied force, and inversely proportional to the contact area. Cutting starts when the total stress exceeds the internal strength of the cutting material. Food products are predominantly characterized by iso-elastic deformation properties that are associated with the ability toward stress relaxation and creep deformation. These time—dependent effects are responsible for the scattering of deformation energy in the zone where the cutting edge contacts the product, and for the expanding deformation. Therefore, the cutting velocity must exceed the stress relaxation velocity to reach the fracture limit; otherwise, the product will not be cut, but rather squeezed. In addition to the desired separation, there is some displacement of the cutting material while the cutting tool penetrates the item. This displacement is responsible for the special features and characteristics as regards the cutting of foods.

When a standard knife with a defined wedge angle a and a blade thickness d cuts into a semi-solid material, three zones with different deformation characteristics can he distinguished: a separation zone in the immediate vicinity of the cutting edge, a deformation zone along the wedge, and a compression zone along the flank of the blade. In these deformation zones (the individual force components acting on the blade play different roles. Upon contact with the edge of the knife, the product will be pushed down. The stress in the separation zone propagates and increases because of the resistance of the material until the fracture stress is exceeded. The characteristic force component at this stage is the cutting resistance FR which, apart from cohesive forces in the material, is heavily influenced by the sharpness of the tool in the deformation zone, the action of the wedge leads to biaxial (horizontal and vertical) deformation, the magnitude of which depends on wedge angle and blade thickness.

When referring to the deformed or distorted fraction of the material, it is necessary to distinguish between a zone of plastic deformation, located in the close vicinity of the cutting edge, and a zone of elastic deformation, which follows the zone of plastic deformation. Lateral displacement leads to the deformation force $F_w$, which is also responsible for the formation of frictional $F_w$ along the wedge surface. Further displacement of the material causes the generation of lateral compression forces $F_1$ in the compression zone, which becomes important since the relative motion accounts for frictional forces along the tool flanks. $F_1$ increases with blade thickness and is of high relevance when cutting products with high friction coefficients. The properties of the material from which the blade is constructed are, along with lateral forces, responsible for the friction that occurs between the product and the knife along the wedge amid the flank, which is significantly involved in the formation of the plastic deformation zone. For efficient cutting, it is especially the plastic deformation that must be efficiently controlled to protect cutting segments from irreversible damage. It is, therefore, extremely important to keep the wedge angle, the thickness of the blade, and the flank area that is in direct contact with the food as small as possible. Otherwise, the cutting tool must show a sufficient firmness to resist the cutting forces.

Ultrasonic cutting can be distinguished from conventional cutting with a standard blade by the specific motion characteristics of the cutting tool, as the conventional movement of the device is super positioned by ultrasonic vibration. Generally, the sonotrode acts as a mechanical resonator, which vibrates mainly longitudinally along the vibration axis. The sonotrode may even act as the cutting tool which, however, requires maximum amplitudes at the cutting edge, or may act as a coupling unit for an independent cutting blade. To ensure stable performance, the entire vibrating system is tuned to a constant operating frequency. Depending on the mounting of the cutting tool, the sonotrode and on the orientation of the cutting edge relative to the vibration axis, three main configurations may be distinguished: The vibration axis and the moving axis of the cutting tool are identical, but the main vibration axis is perpendicular to the cutting edge. This is, for example, true in a guillotine—type cut where the stress and strain acting on the material due to the macroscopic iced motion is intensified or diminished by a periodical stress with a high frequency (that is. 20-50 kHz) and a low amplitude (in the micrometer range). Stress and strain are mainly exerted in the separation zone where the edge is in contact with the crack tip in the product.

The principle of ultrasonic cutting machine is totally different from that of traditional cutting. It uses the energy of ultrasonic waves to heat and melt the parts of the cut material, so as to achieve the purpose of cutting the material. Therefore, Ultrasonic cutting does not require as sharp of a cutting edge as compared to a traditional blade, nor does it require great pressure, which will not cause the edge breakage and damage of the cutting material. At the same time, because the cutting tool is doing ultrasonic vibration, the friction resistance is very small, the cut material is not easy to stick to the blade. This is especially effective for cutting the viscous and elastic materials, frozen materials, such as food, or objects that are difficult to apply pressure.

One implementation of the technology as disclosed and claimed herein is an automated computer controlled method for performing a cut on a meat item, which includes capturing a three dimensional image of a meat item with a three dimensional vision system coupled to a computer that generates 3-dimensional point cloud data representative of the meat item. The vision system can include one or more digital cameras or three dimensional sensors or three dimensional scanners, such as a laser scanner that is operable to capture a three dimensional digital image of a poultry item or other meat item and transmit the digital image to a computer system for further processing of the data. A point cloud is a set of data points in some coordinate system. In a three-dimensional coordinate system, points are defined by Cartesian or polar coordinates. The point cloud is intended to represent the external three dimensional surface of an object—in this case a poultry item or other meat item. Point clouds may be created by vision systems. The vision system capture an image of the item in question and derives from the captured image and measures a large number of points on an object's surface, and often output a point cloud as a data file to a computing system. The point cloud represents the set of points the device has measured.

One implementation of the technology also includes comparing, with a comparison algorithm processing on a computer, the generated point cloud data with one or more electronically stored point cloud template data sets and selecting the point cloud template data set that most closely matches the generated point cloud data as generated by the vision system and associated computing system. Various point comparison techniques can be utilized for the comparison algorithm processing on the computer system. The point cloud template data sets are various data sets that are statistically representative of the size and shapes of a typical bird being processed. These templates are associated with typical skeletal bone and tendon positions that are typical for a poultry having a particular shape and/or size. Three dimensional data matching is performed comparing the point cloud for the captured image with the various templates. One approach for comparing point clouds that is used by the comparison algorithm is based on local feature descriptors. The point cloud for the captured image is cropped and the cropped data is transformed to a set of distinctive local features each representing a region. The features are characterized with descriptors containing local surface properties for matching with the templates. An iterative closest point methodology is one approach utilized by the comparison algorithm for another implementation. However, various other matching/comparison techniques can be utilized without departing from the scope of the technology as disclosed and claimed herein.

The method includes aligning with a computer the selected point cloud template data set with a cropped version of the generated point cloud data and calculating a three dimensional cut path based on the alignment using statistically representative data for a given size bird, which statically defines the location of the various portion of the anatomy including muscle, joint tendon and bone structures and placement, and said cut path is calculated to have a minimal cutting depth while sufficient to sever the tendons around the shoulder joint. One implementation of the technology includes calculating a cut path and articulating a blade with multiple degrees of freedom while cutting a meat item. One example of a meat item is a poultry item and one example of a cut is a shoulder cut.

One implementation includes articulating the blade with 6 or more degrees of freedom while cutting a meat item. However, fewer degrees of freedom can be implemented with departing from the scope of the technology as disclosed and claimed herein. One implementation can also include controlling an automated robotic arm having an ultrasonic knife implement to cause a blade of the ultrasonic knife implement to traverse along the cut path of the meat item. One specific example of using this methodology is where the meat item is a poultry item and the cut path is a shoulder cut path. One function of the technology is to perform the severing of the tendons around the shoulder joint with the ultrasonic knife as the ultrasonic knife travels along the cut path. A further step of the method can include grasping and pulling the wing of the poultry item and pulling the breast meat off a frame of the poultry item, where the cutting path depth is sufficient to sever the shoulder joint.

For one implementation, a point cloud is a set of data points in space. The point clouds can be produced by a 3D scanner, which measures a large number of points on the external surfaces of objects around them, in this case of the present technology, the object is a meat item being operated on. As the output of 3D scanning processes, point clouds are used for many purposes, including to create 3D CAD models for manufactured parts, for metrology and quality inspection, and for a multitude of visualization, animation, rendering and mass customization applications. In this case, the point cloud scanning process is used for a meat item. The point clouds are aligned with 3D models of the item being operated on, or with other point clouds, a process known as point set registration. In computer vision and pattern recognition (the automated recognition of patterns and regularities in data), point set registration, also known as point matching, is the process of finding a spatial transformation that aligns two point sets. This methodology is utilized to match the point set of the capture image with the point set of the template of the item to be operated on.

The field of pattern recognition is concerned with the automatic discovery of regularities in data through the use of computer algorithms and with the use of these regularities to take actions such as classifying the data into different categories such as categorizing parts of an object such as the shoulder area of a poultry item and from that information determining the likely anatomical structure and location based on statistically representative data. Pattern recognition algorithms are used to provide a reasonable answer for all possible inputs and to perform "most likely" matching of the inputs, taking into account their statistical variation. This is opposed to pattern matching algorithms, which look for exact matches in the input with pre-existing patterns.

Pattern recognition is generally categorized according to the type of learning procedure used to generate the output value. For one implementation of the technology as disclosed and claimed, supervised learning is used, which provides a set of training data (the training set), in this case the point cloud templates of different sized poultry items, consisting of a set of instances that have been properly labeled with the correct output. A learning procedure then generates a model that attempts to meet two sometimes conflicting objectives: Perform as well as possible on the training data, and generalize as well as possible to new data. For one implementation, unsupervised learning can be utilized, which assumes training data that has not been labeled, and attempts to find inherent patterns in the data that can then be used to determine the correct output value for new data instances.

The purpose of finding such a transformation includes merging multiple data sets into a globally consistent model, and mapping a new measurement to a known data set to identify features or to estimate its position. A point set may be raw data from 3D scanning or an array of rangefinders. For use in image processing and feature-based image registration, for one implementation a point set is a set of features obtained by feature extraction from an image, for example corner detection. Point set registration is used in optical character or object recognition, augmented reality and aligning data from magnetic resonance imaging with computer aided tomography scans. In the present case, the technology is utilized to recognize the portions of a poultry item. While point clouds can be directly rendered and inspected, for one implementation, point clouds are converted to polygon mesh or triangle mesh models, surface models, or CAD models through a process commonly referred to as surface reconstruction.

One implementation of the technology disclosed and claimed herein includes capturing a 3D image of a poultry item and converting the image to a point cloud. The point cloud of the converted live image is compared to the one or more of the pre-stored point cloud templates representative of known different sized and shaped poultry items and the closest matching template point cloud is chosen. A cutting path control algorithm is retrieved that corresponds with the closest matching template point cloud. The closest matching template point cloud is then registered with converted live image point cloud, adjustments are made to the matching template point cloud and the cutting path is adjusted according and the cut is performed. There are many techniques for converting a point cloud to a 3D surface. Some approaches, like Delaunay triangulation, alpha shapes, and ball pivoting, build a network of triangles over the existing vertices of the point cloud, while other approaches convert the point cloud into a volumetric distance field and reconstruct the implicit surface so defined through a marching cubes algorithm.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which.

Figure 1A:
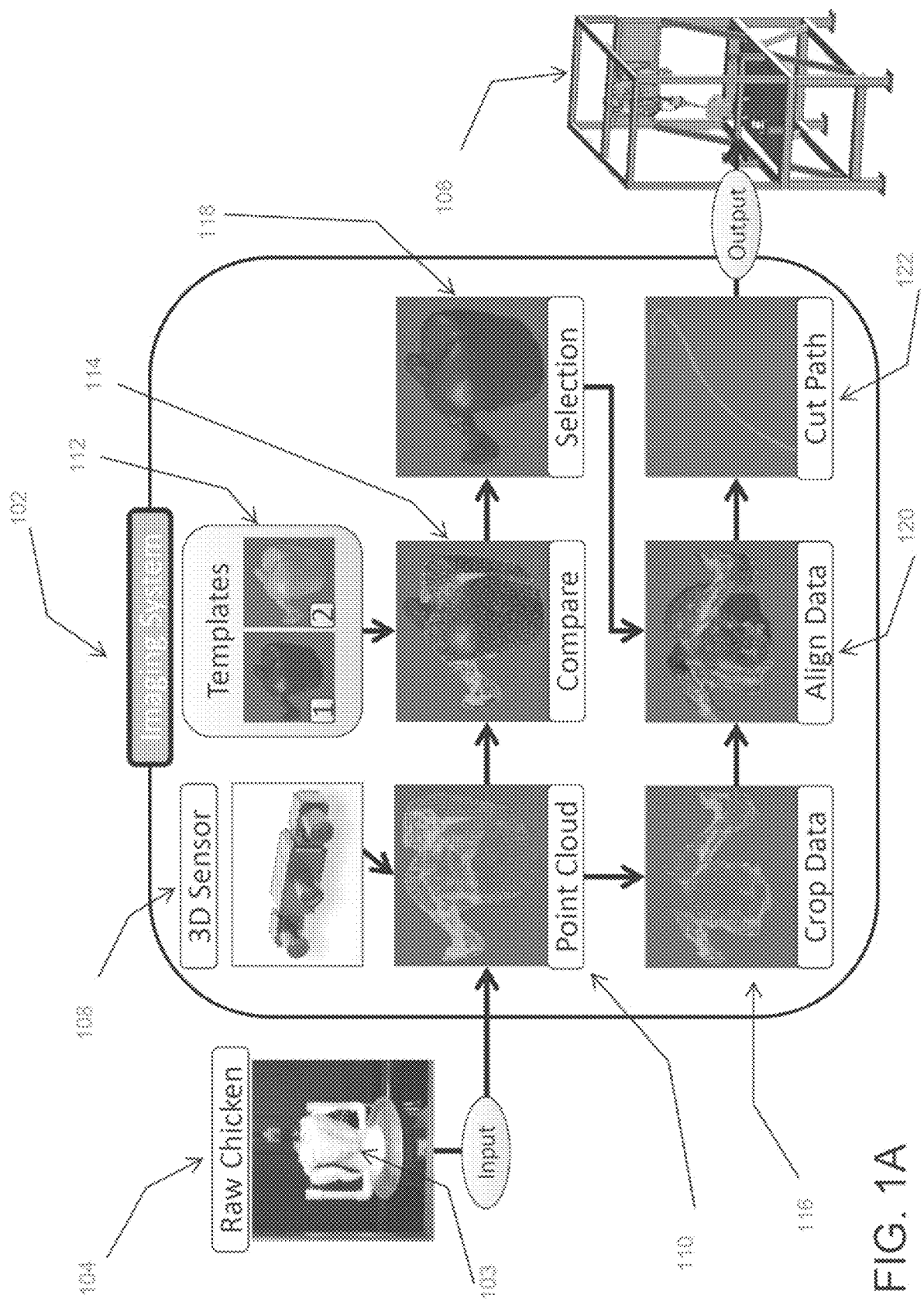
FIGS. 1A and 1B are illustrating a computer based imaging system for generating point cloud data.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1A-3D and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified.

One implementation of the present technology as disclosed comprises a computer controlled robotic arm with an ultrasonic knife implement, which teaches an apparatus and method for performing a cut path for processing a deboned meat cut, particularly a poultry cut.

Figure 1B:
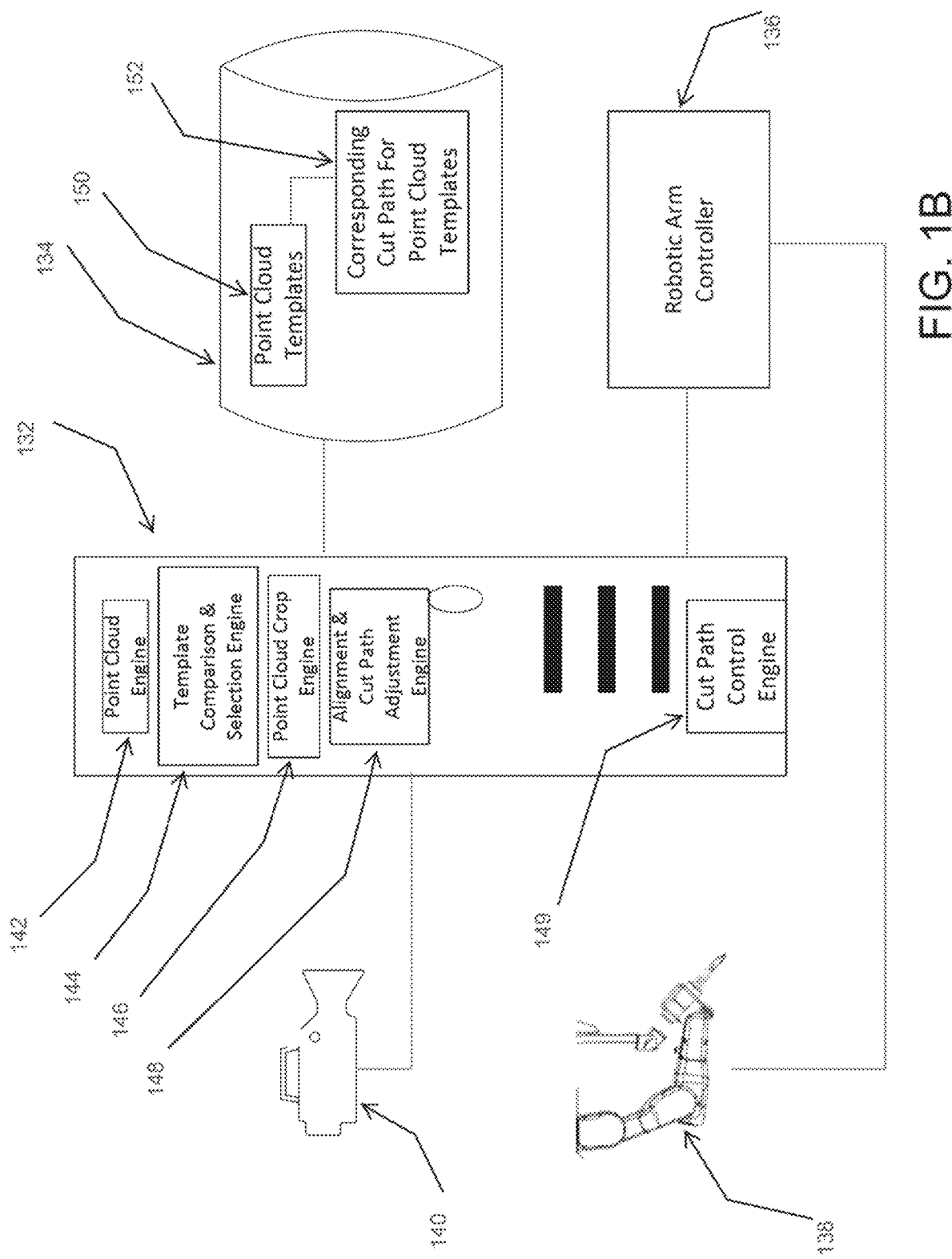

The details of the technology as disclosed and various implementations can be better understood by referring to the figures of the drawing. Referring to FIGS. 1A and 1B, one implementation of the technology is disclosed, which includes an automated computer controlled method for performing a meat cut, which includes capturing a three dimensional image of a meat item with a three dimensional imaging system 102, including a vision system 108 coupled to a computer that generates point cloud data 110 representative of a meat item 104. The vision system 102 includes one or more digital cameras or three dimensional sensors or three dimensional scanners 108, such as a laser scanner, that is operable to capture a three dimensional digital image of a poultry item 104 (or other meat item) positioned on a mounting stand 103 that is placed within the field of view of the vision system 108 or other meat item and the vision system transmits the digital image to the computer system for further processing of the data. The image that is captured is converted to a point cloud data set representative of the captured image. The point cloud data has a resolution or point density and spacing between points sufficient to resolve the size of a poultry item and correlate to the statistically representative anatomical structure. The computing system is coupled to an ultrasonic knife assembly 106 that performs the cut. A point cloud is a set of data points in some coordinate system. In a three-dimensional coordinate system, the data points are defined by Cartesian coordinates or polar coordinates. The point cloud is intended to represent the external three dimensional surface of an object—in this case a poultry item or other meat item. Point clouds may be created from scans provided by 3D scanners 108 or cameras having sufficient resolution. For one implementation the cameras/scanners have a 1080×1080 resolution or better. These scanners/cameras capture a sufficient high resolution image from which the system can measure a large number of points on an object's surface, and output a point cloud as a data file 110 to a computing system. The point cloud data 110 represents the set of points derived from the image that the sensor 108 has captured and measured.

One implementation of the technology also includes comparing 114 the point cloud computer generated data 110 with one or more point cloud template data sets 112 and selecting 118 the point cloud template data set that most closely matches the generated point cloud data. One or more point comparison techniques are utilized. The point cloud template data sets 112 are various data sets that are statistically representative of the size and shapes of a typical bird being process. These templates are associated with typical skeletal bone and tendon positions that are typical for a poultry having a particular shape and/or size. Three dimensional data matching 114 is performed comparing the point cloud for the captured image with the various templates. One approach for comparing point clouds is based on local feature descriptors. The point cloud for the captured image can be cropped and the cropped data can be transformed to a set of distinctive local features each representing a region. The features are characterized with descriptors containing local surface properties for matching with the templates. For one implementation of the technology, an iterative closest point methodology can then be utilized. However, for other implementations various other matching techniques can be utilized.

For one implementation, the method includes aligning 120 with the computer the selected point cloud template data set 118 with a cropped version 116 of the generated point cloud data and calculating a three dimensional cut path 122 based on the alignment 120 and said cut path 122 is calculated to have a minimal cutting depth while having a sufficient cutting depth to sever the tendons around the shoulder joint.

One implementation of the technology is an automated computer controlled system 132 for performing a meat cut, which includes a three dimensional vision system 140 coupled to a computer 132, where said vision system and computer captures a three dimensional image of a meat item where the computer generates point cloud data with a point cloud engine 142 processing at the computer. The point cloud data is representative of the captured three dimensional image of the meat item. One implementation of the technology includes a database 134 having stored thereon one or more retrievable point cloud template data sets 150 and separate cut path control data 152 corresponding to each of one or more point cloud template data sets. The control data can be interpreted by the computing system to control the cut path of the blade. A selection engine 144 is processing at the computer and comparing the generated point cloud data, with one or more point cloud template data sets 150 stored in the database 134 and selecting the best matching point cloud template data set that most closely matches the generated point cloud data.

One implementation of the technology includes a cropping function 146 executing at the computer to thereby crop the point cloud data, thereby providing a cropped version of the point cloud data and said computer having stored thereon said cropped version of the point cloud data. An alignment and cut path adjustment engine 148 is processing at the computer to thereby align the selected point cloud template data set with the cropped version of the generated point cloud data thereby defining alignment adjustments and retrieving the cut path control data that corresponds to the selected best matching point cloud template. A cut path control engine processing at the computer, thereby calculates a final cut path from the retrieved cut path corresponding to the selected best matching point cloud template based on the defined alignment adjustments. The cut path control engine 149 thereby controls and articulates a control arm 138 of a blade of an ultrasonic knife along the calculated final cut path with multiple degrees of freedom while cutting a meat item, where articulating along a final cut path includes vibrating the blade at an ultrasonic frequency. A robotic arm controller 136 controls the ultrasonic knife implement to cause a blade of the ultrasonic knife implement to vibrate at an ultrasonic frequency. For one implementation of the technology, the one or more point cloud template data sets 150 stored in a database 134 is representative of a poultry item and the cut path control data is for a shoulder cut path. The ultrasonic knife is positioned at a series of positions along the cut path to perform the cut as controlled by the computing system. Once the cut is performed, a grasping implement grasps and pulls the wing of the poultry item and pulls the breast meat off a frame of the poultry item.

Figure 2:
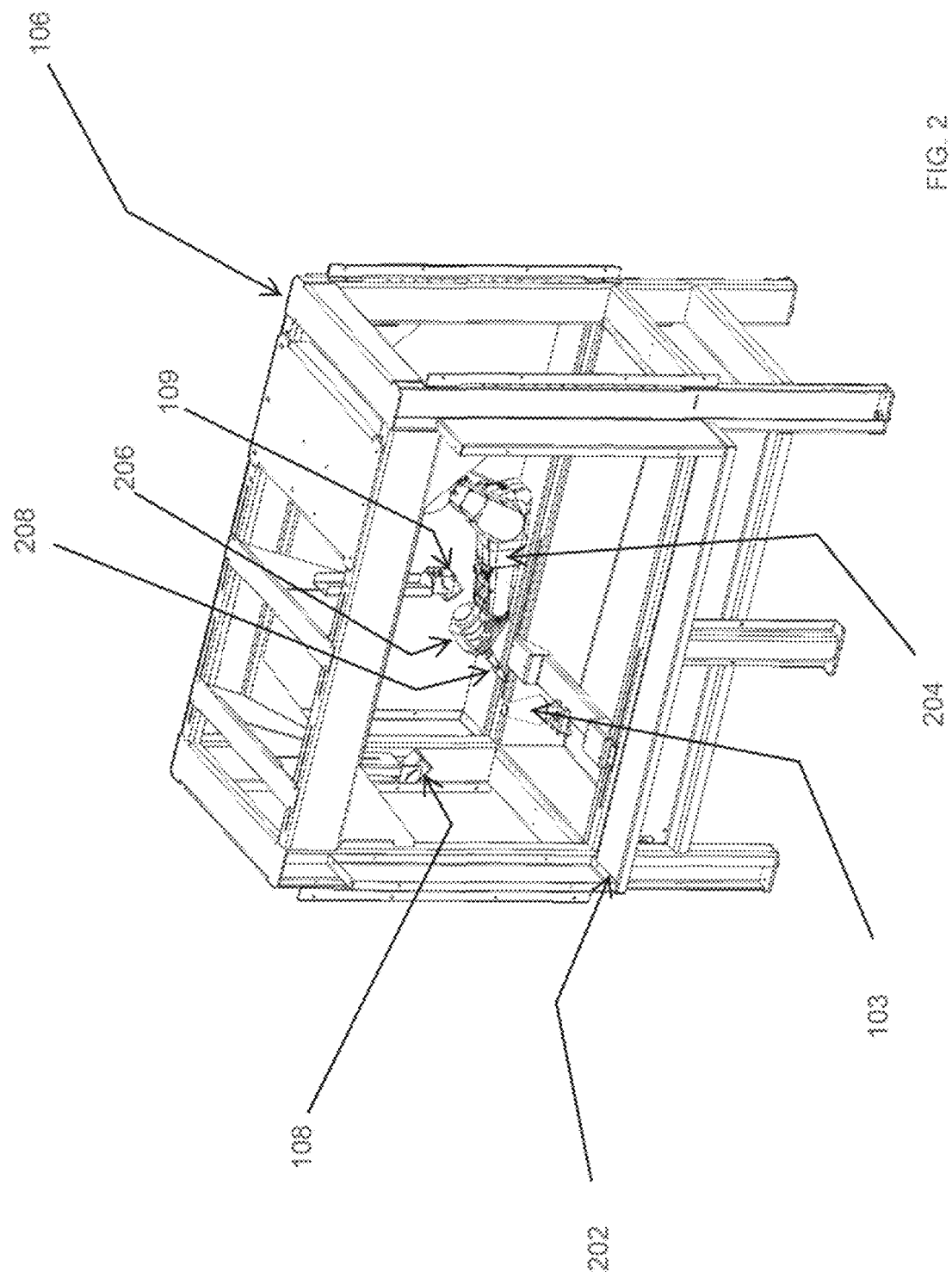
FIG. 2 is an illustration of an apparatus configured with an ultrasonic knife attached to a robotic arm mounted on a frame.
Figure 3A:
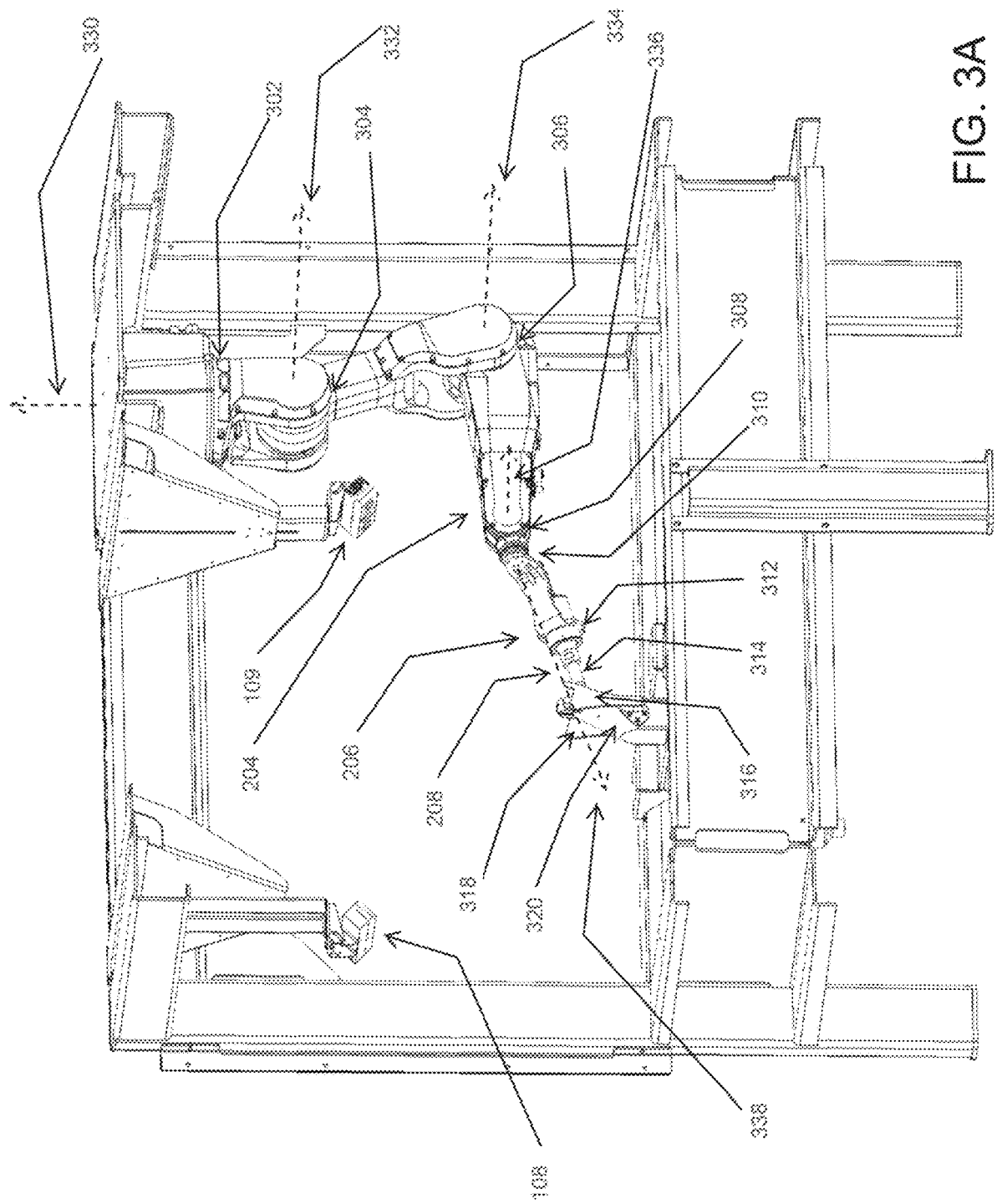
FIGS. 3A through 3C are illustrating an apparatus configured with an ultrasonic knife attached to a robotic arm mounted on a frame with portions of the frame redacted from the view for clarity.
Figure 3B:
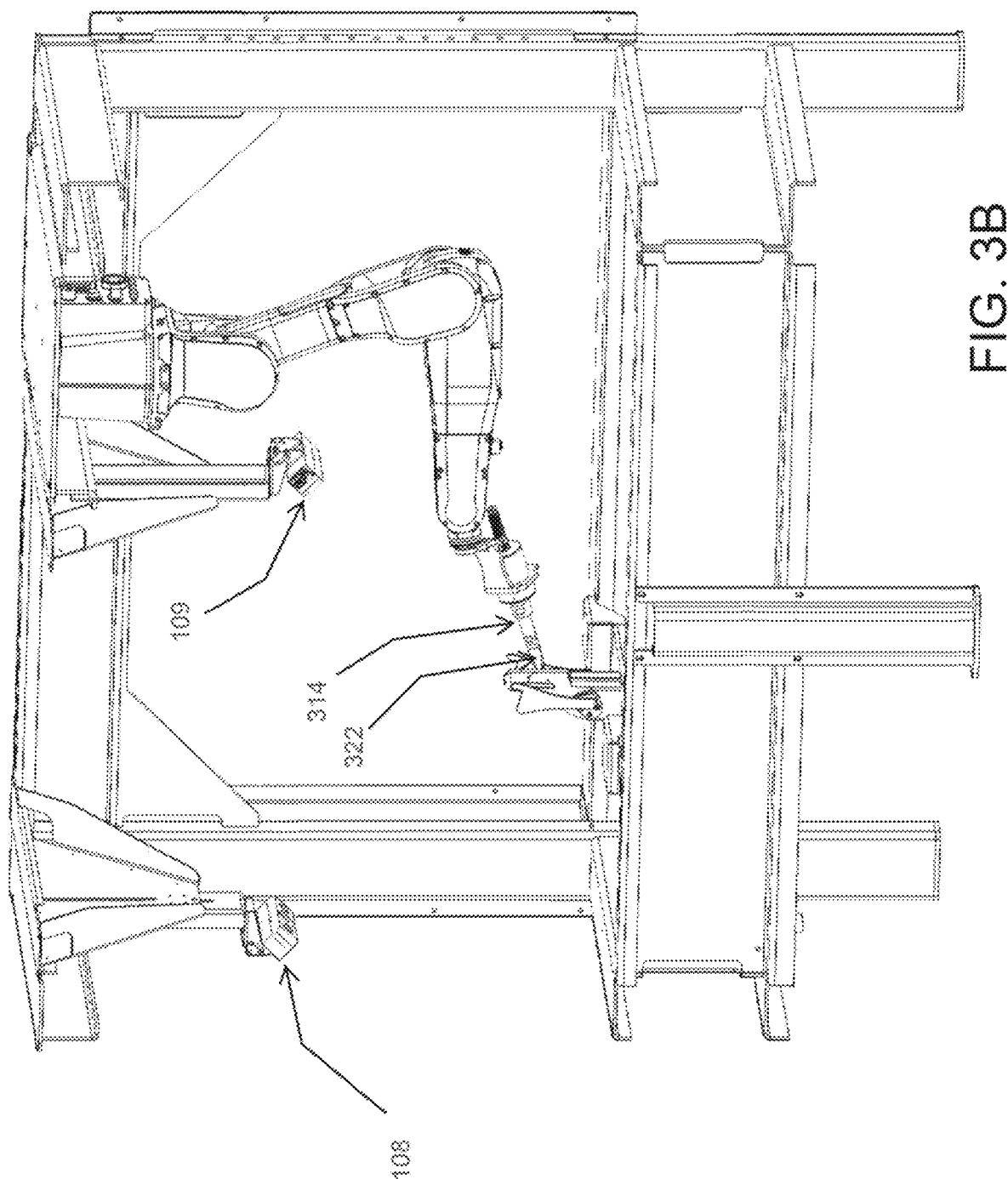
Figure 3C:
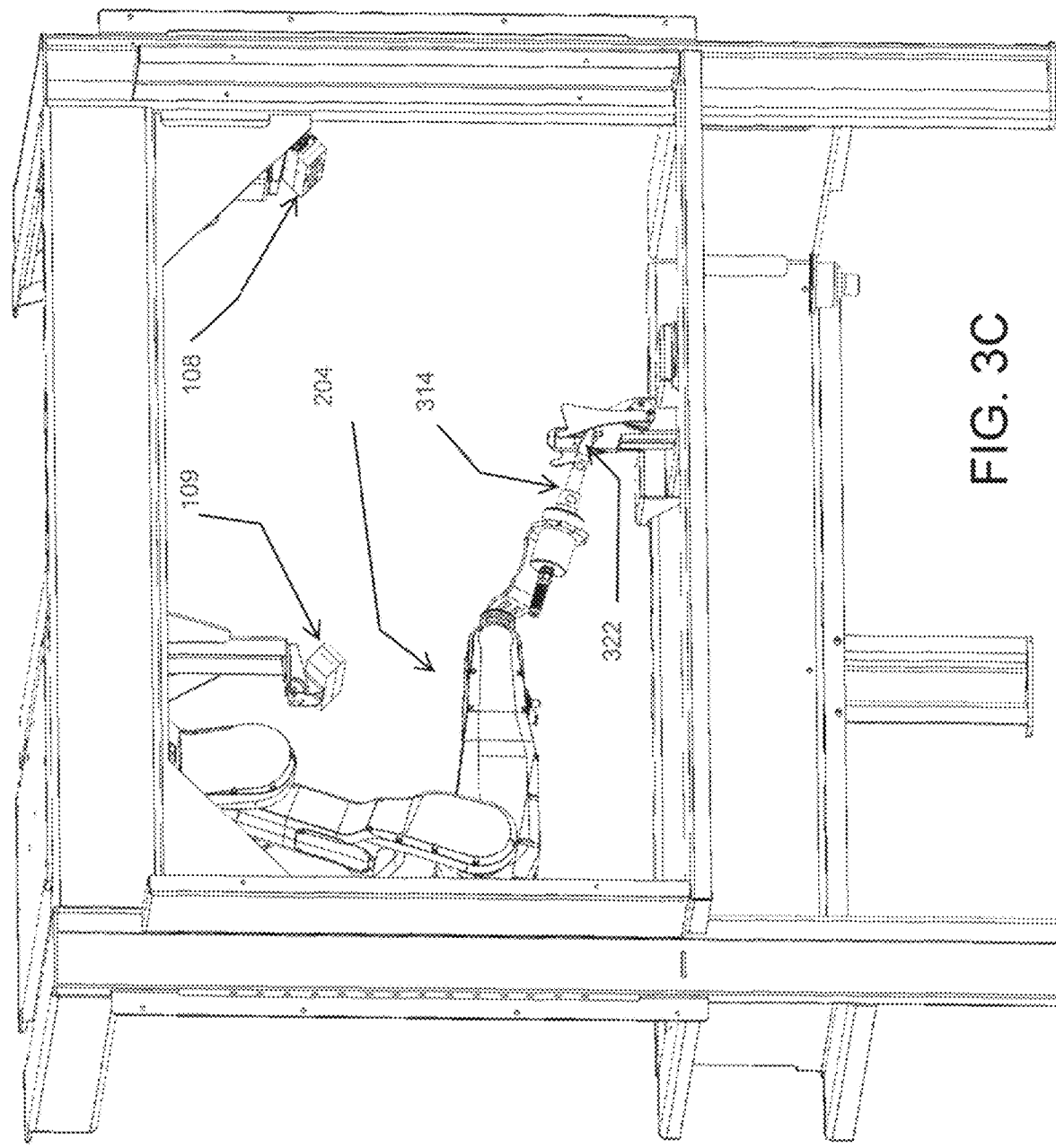
Figure 3D:
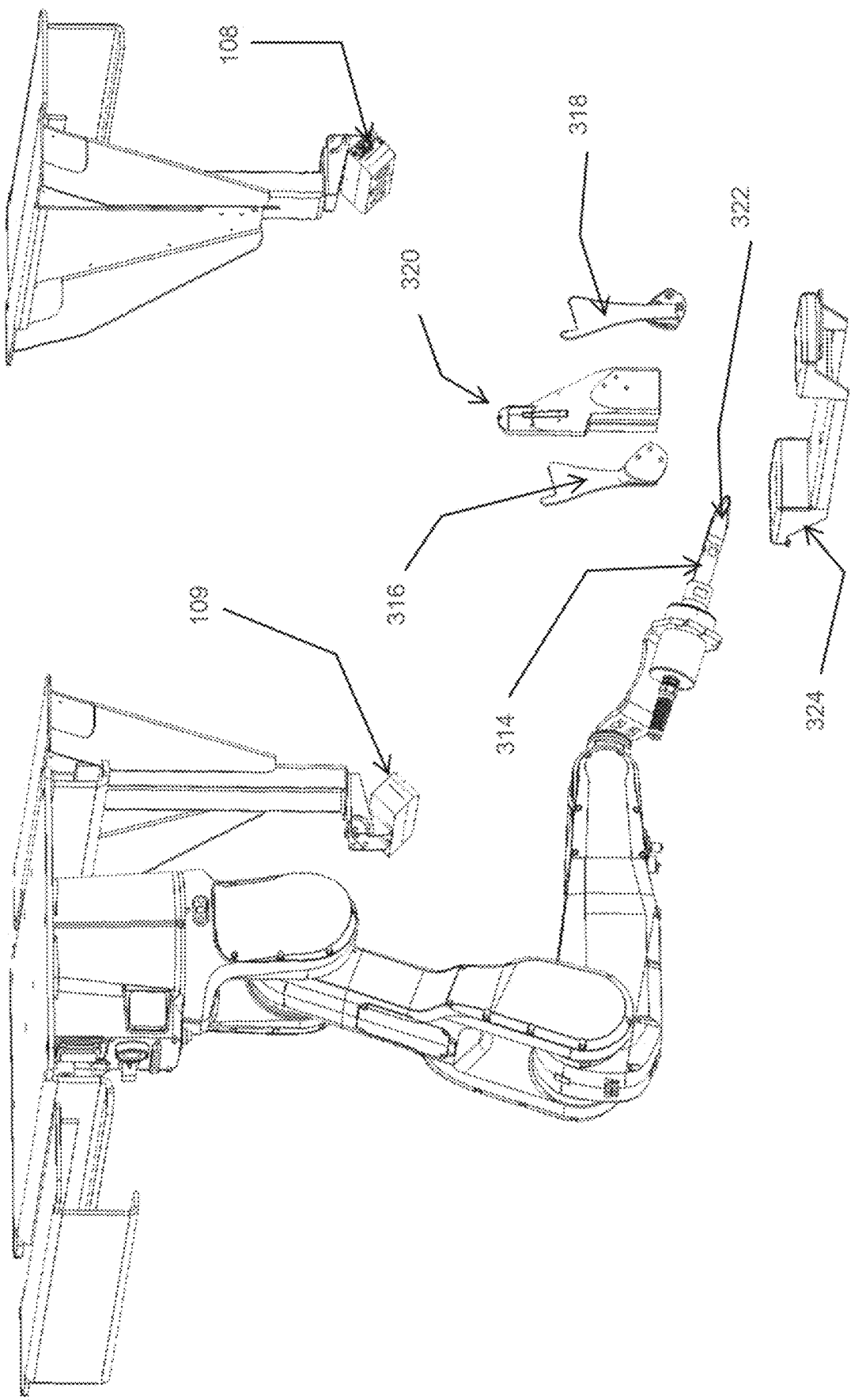
FIG. 3D is an illustration of an apparatus configured with an ultrasonic knife attached to a robotic arm mounted on a frame with portions of the frame redacted from the view for clarity and illustrating an exploded view of the product mount for clarity.

Referring to FIG. 2, one implementation of the technology as disclosed and claimed herein includes controlling with a computing system an automated robotic arm 204 having an ultrasonic knife implement 206 to cause a blade 208 of the ultrasonic knife implement to traverse along the cut path of the meat item. One specific example of using this methodology is where the meat item is a poultry item and the cut path is a shoulder cut path. One function of the technology is to perform the severing of the tendons around the shoulder joint with the ultrasonic knife as the ultrasonic knife travels along the cut path. A further step of the method can include grasping and pulling the wing of the poultry item and pulling the breast meat off a frame of the poultry item, where the cutting path depth is sufficient to sever the shoulder joint. The apparatus includes an ultrasonic knife assembly and frame 106.

Referring to FIGS. 3A through 3D, an illustration of the ultrasonic knife is shown mounted to a robotic arm within an overall assembly frame. The overall assembly frame shows an implementation that includes a vision system including two three dimensional scanners/cameras 108 and 109. FIGS. 3A through 3D further illustrate a robotic arm 204 and an ultrasonic knife assembly 206 and 208. The robotic arm 204 is mounted to a frame assembly and the robotic arm 204 includes a main rotation hub 302 that provides rotation about a substantially vertical axis 330 of the arm portion extending beyond the rotation hub. The direction or path of rotation lies in a substantially horizontally oriented plane. The robotic arm has a shoulder joint 304 that allows the portion of the arm extending beyond the shoulder joint to pivot and rotate about axis 332. The direction or path of rotation lies in a substantially vertically oriented plane. The robotic arm has an elbow joint 306 that allows the portion of the arm extending beyond the elbow joint to pivot and rotate about axis 334. The direction or path of rotation lies in a substantially vertically oriented plane. The direction or path of rotation lies in a substantially vertically oriented plane. The robotic arm has a wrist joint 308 that allows the portion of the arm extending beyond the wrist joint to pivot and rotate about axis 336. The direction or path of rotation lies in a substantially vertically oriented plane. The rotation arm also has an end joint 310, which allows the end portion of the arm to rotate about the axis 338. The knife assembly 312 and 314 illustrate an ultrasonic knife assembly. The meat item to be cut, for an example a poultry item, is mounted on the mounting cone 320. The platform 324 for accommodating the item to be operated on can include opposing outside wing spreaders 316 and 318. The blade is illustrated by item 322.

An ultrasonic cutter vibrates its blade with amplitudes of 10-70 μm in the longitudinal direction. The vibration is microscopic, so it cannot be seen. The movement repeats 18,000-40,000 times per second (18-40 kHz). An ultrasonic knife includes a "transducer" that generates vibration and an "oscillator" that drives the transducer. A piezoelectric element is used for the transducer. When voltage is applied, the piezoelectric element displaces the transducer by a few micrometers. Periodically applying voltage generates vibration. Each object has its special frequency, by which the object is stable and easy to vibrate. By adding an external force that corresponds to that special frequency, a small force can obtain a large vibration. This phenomenon is called resonance. In an ultrasonic cutter, the piezoelectric element generates a force that resonates the whole body, from the transducer to the blade tip and/or cutting edge of the blade 322, generating a large vibration at the tip and/or cutting edge. The oscillator periodically generates voltage to resonate and drive the transducer. Using a component of the ultrasonic cutter called the horn/Sonotrode to wring the cross-sectional area, from the piezoelectric element to the blade tip, can obtain a larger vibration.

The vibration of the blade 322 makes the cutting faster because the vibration of the blade also slices the material being cut in addition to the force that you're applying to the blade. If the vibrations are along the correct axis, as in said knife, then they'll do the exact same thing as a standard knife would do when pushed into a material for cutting, that is applying a force, meaning that the knife does most of the work in cutting because the vibration performs the same work as would be provided by applying a force to a standard blade.

The ultra-sonic generator converts the power supply (100-250 Volts, 50-60 Hz) into a 20 to 30 kHz, 800-1000 Volts electrical signal. This signal is applied to piezo-electrical ceramics (included in the converter) that will convert this signal into mechanical oscillations. These oscillations will be amplified by the booster and converter. The converter converts electricity into high frequency mechanical vibration. The active elements are usually piezo-electrics ceramics. The booster (optional) serves as an amplitude transformer.

The actuator vibrates at an extremely high frequency, making it ultrasonic, and it is these waves of vibration that are transmitted by the horn of the actuator all the way to the blade itself. The vibrations are created at the actuator and are transferred by the horn to a free mass. The free mass vibrates between the blade and the horn of the actuator to transmit the vibrations down the blade. The repetitive impact on the blade by the free mass, creates stress pulses that transmit to the tip/blade edge of the blade and into the item being cut. Ultimately, the repetitive cutting of the blade produces enough strain on the surface of the item being cut to fracture it. The effect of ultrasonic cutting parameters, such as resonant frequency, mode of vibration, blade tip sharpness, cutting force, cutting speed, and blade tip/blade edge amplitude are all factors.

Ultrasonic food cutting technology goes beyond the limits of conventional cutting systems by utilizing a vibrating blade as opposed to a static blade. The vibrations create an almost frictionless cutting surface, providing neater cuts, faster processing, minimal waste, longer blade life and less downtime. The induced oscillation at the cutting edge of the sonotrode with defined vibration amplitude results in faster and more efficient cutting due to less mechanical cutting force needed in comparison to other conventional blade methods or laser cutters and/or water jet cutters. The pressure on the item to be cut can be reduced due to the high number of frequencies per second. This creates a clean cut face. Ultrasound application for cutting enhances the cut surface quality, lowers the energy for cutting and improves the cut exactness. The induced oscillation at the cutting edge of the sonotrode with defined vibration amplitude results in faster and more efficient cutting due to less mechanical cutting force needed in comparison to other conventional methods such as laser cutters and water jet cutters. In fact, the vibration reduces the friction resistance at the cutting surface.

The various implementations and examples shown above illustrate a method and system for use of an ultrasonic knife to perform a cut. A user of the present method and system may choose any of the above implementations, or an equivalent thereof, depending upon the desired application. In this regard, it is recognized that various forms of the subject ultrasonic knife method and system could be utilized without departing from the scope of the present technology and various implementations as disclosed.

Certain systems, apparatus, applications or processes are described herein as including a number of modules. A module may be a unit of distinct functionality that may be presented in software, hardware, or combinations thereof. For example the three dimensional scanners can be considered modules having photo sensors and software to control the capture and exporting of the cloud data. A module can also include the computing system to which the three dimensional scanners are connected. When the functionality of a module is performed in any part through software, the module includes a computer-readable medium. The modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, PLC or Robotic controller or any machine capable of executing a set of instructions (sequential or otherwise) that specify actions to be taken by that machine or computing device. For the technology as disclosed and claimed herein, a portion of the machine is a computing system 132. The computing system is modified to be particularly configured to include a Point Cloud Engine, a Template Comparison and Selection Engine, a Point Cloud Crop Engine, an Alignment and Cut Path Adjustment Engine and a Cut Path Control Engine to perform the functions as described herein. Further, while only a single machine is illustrated, the term "machine" shall also be taken to include any collection of machines that individually or jointly execute a set (or multiple sets) of instructions to perform any one or more of the methodologies discussed herein. If the machine is a computer, the computer can be modified by software to interface with and control other hardware to perform tasks as with the various engines described herein. For the present technology as disclosed and claimed herein, the computing system is coupled with a robotic ultrasonic knife assembly configured to be controlled by the computing system as disclosed and claimed herein. Regarding the present disclosure, the computer can be configured with software that is operable to be executed to control signal outputs to the robotic arm.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

The various ultrasonic knife examples described above illustrate a method for performing a meat cut. A user of the present technology as disclosed may choose any of the above implementations, or an equivalent thereof, depending upon the desired application. In this regard, it is recognized that various forms of the subject ultrasonic knife could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. An automated computer controlled method for performing a meat cut comprising:
    capturing a three dimensional image of a meat item with a three dimensional vision system coupled to a computer that derives point cloud data from the three dimensional image with a point cloud engine processing at the computer, where said point cloud data is representative of a surface contour of the captured three dimensional image of the meat item;
    cropping with the point cloud engine, the point cloud data thereby creating and storing a cropped version of the point cloud data for use in defining distinctive local features;
    transforming with the point cloud engine, the cropped version of the point cloud data to include a set of distinctive local features each representing a region and characterizing each of the set of distinctive local features with descriptors containing local surface properties, thereby creating, using feature-based image registration, a derived point cloud data set having the set of distinctive local features each with descriptors containing local surface properties;
    categorizing parts of the derived point cloud data set based on the distinctive local features and descriptors, thereby determining structures and corresponding locations;
    comparing, with a template comparison and selection engine processing at the computer, the derived point cloud data set with one or more point cloud template data sets stored in a database and selecting a selected point cloud template data set that matches the derived point cloud data set based on determining the best match of the distinctive local features and descriptors and the determined structures and corresponding locations;
    aligning, with an alignment and cut path adjustment engine processing at the computer, the selected point cloud template data set with the derived point cloud data set based on the distinctive local features and descriptors and the determined structures and corresponding locations, thereby defining alignment adjustments and retrieving cut path control data that corresponds to the selected point cloud template data set;
    calculating a final cut path control data from the retrieved cut path control data corresponding to the selected point cloud template data set based on the defined alignment adjustments;
    controlling and articulating a blade of an ultrasonic knife, in relation to a predetermined axis of the ultrasonic knife, with the final cut path control data along a final cut path with multiple degrees of freedom while cutting a meat item, where articulating along the final cut path includes vibrating the blade at an ultrasonic frequency; and
    controlling the ultrasonic knife implement to cause a blade of the ultrasonic knife implement to vibrate at an ultrasonic frequency.

2. The method for performing a meat cut as recited in claim 1, where the meat item is a poultry item and the cut path is a shoulder cut path.

3. The method for performing a meat cut as recited in claim 2, comprising:
    severing the tendons around the shoulder joint with the ultrasonic knife as the ultrasonic knife travels along the final cut path; and
    grasping and pulling the wing of the poultry item and pulling the breast meat off a frame of the poultry item.

4. The method for performing a meat cut as recited in claim 3, where a final cutting path depth is sufficient to sever the shoulder joint.

5. The method for performing a meat cut as recited in claim 2, where the blade of the ultra-sonic knife has a beveled edge having an angle from approximately 15 degrees to approximately 70 degrees.

6. The method for performing a meat cut as recited in claim 2, comprising:

generating an additional cut path template and an additional corresponding cut path based on the final cut path and the generated point cloud data and storing the additional cut path template.

7. An automated computer controlled system for performing a meat cut comprising:
- a three dimensional vision system coupled to a computer, where said vision system and computer captures a three dimensional image of a meat item where the computer generates point cloud data with a point cloud engine processing at the computer, where said point cloud data is representative of the captured three dimensional image of the meat item;
- a cropping function that executes at the computer to thereby crop the generated point cloud data, thereby providing a cropped version of the point cloud data and said computer having stored thereon said cropped version of the generated point cloud data for use in defining distinctive local features;
- a transformation function that executes at the computer with the point cloud engine to thereby transform the cropped version of the point cloud data to include a set of distinctive local features each representing a region and characterizing each of the set of distinctive local features with descriptors containing local surface properties, thereby creating a derived point cloud data set having the set of distinctive local features each with descriptors;
- a categorization function using feature-based image registration that executes on the computer with the point cloud engine to thereby categorize parts of the derived point cloud data set based on the distinctive local features and descriptors containing local surface properties, thereby determining structures and corresponding locations;
- a template comparison and selection engine that processes at the computer, to thereby compare the derived point cloud data set with one or more point cloud template data sets stored in a database and select a selected point cloud template data set that matches the derived point cloud data set based on determining the best match of the distinctive local features and descriptors and the determined structures and corresponding locations;
- an alignment and cut path adjustment engine that processes at the computer to thereby align the selected point cloud template data set with the derived point cloud data set based on determining the best match of the distinctive local features and descriptors and the determined structures and corresponding locations thereby defining alignment adjustments and retrieving cut path control data that corresponds to the selected best matching point cloud template data set;
- a cut path control engine that processes at the computer to thereby calculate a final cut path control data from the retrieved cut path control data corresponding to the selected best matching point cloud template data set based on the defined alignment adjustments;
- said cut path control engine thereby controls and articulates a blade of an ultrasonic knife, in relation to a predetermined axis of the ultrasonic knife, with the final cut path control data along a final cut path with multiple degrees of freedom while cutting a meat item, where articulating along the final cut path includes vibrating the blade at an ultrasonic frequency; and
- a robotic arm controller having a control function that controls the ultrasonic knife implement to cause a blade of the ultrasonic knife implement to vibrate at an ultrasonic frequency.

8. The system as recited in claim 7, where the one or more point cloud template data sets stored in a database is representative of a poultry item and the cut path control data is for a shoulder cut path.

9. The system as recited in claim 8, comprising:
- said ultrasonic knife position along the cut path; and
- a grasping implement grasping and pulling the wing of the poultry item and pulling the breast meat off a frame of the poultry item.

10. The system as recited in claim 9, where the cut path control data is for a shoulder cut path where a cutting path depth is sufficient to sever the shoulder joint.

11. The system as recited in claim 8, where the blade of the ultrasonic knife has a beveled edge having an angle from approximately 15 degrees to approximately 70 degrees.

12. The system as recited in claim 8, comprising:
- an additional cut path template and an additional corresponding cut path based on the final cut path and the generated point cloud data and storing the additional cut path template.

* * * * *

UNITED STATES PATENT AND TRADEMARK OFFICE
CERTIFICATE OF CORRECTION

| | | |
|---|---|---|
| PATENT NO. | : 11,992,931 B1 | |
| APPLICATION NO. | : 16/201294 | |
| DATED | : May 28, 2024 | |
| INVENTOR(S) | : Doug Foreman et al. | |

It is certified that error appears in the above-identified patent and that said Letters Patent is hereby corrected as shown below:

On the Title Page

Item (72) CORRECT INVENTOR NAME:
FROM: SHANE THOMAS SHELBOUM
TO: SHANE THOMAS SHELBOURN Signed and Sealed this
Fifth Day of November, 2024

Katherine Kelly Vidal
*Director of the United States Patent and Trademark Office*